Nov. 17, 1959     C. GERST     2,912,872
COUNTERROTATING TRANSMISSION
Filed May 19, 1958     3 Sheets-Sheet 1

Nov. 17, 1959     C. GERST     2,912,872
COUNTERROTATING TRANSMISSION

Filed May 19, 1958     3 Sheets-Sheet 3

INVENTOR.
Chris Gerst
BY
Balluff & McKinley
ATTORNEYS.

United States Patent Office 2,912,872
Patented Nov. 17, 1959

2,912,872
COUNTERROTATING TRANSMISSION

Chris Gerst, Detroit, Mich., assignor to The Transmission & Gear Company, Dearborn, Mich., a corporation of Michigan Application May 19, 1958, Serial No. 736,012

22 Claims. (Cl. 74—360)

This invention relates to transmissions and has particular reference to a counterrotating transmission which is particularly adapted for use in tractor type vehicles and is adapted to provide a 4-speed forward and reverse drive for each driving sprocket or wheel, the arrangement being such that one of the drive sprockets may be driven independently of the other.

A principal object of the invention is to provide a novel, simple, and relatively inexpensive 4-speed forward and reverse counterrotating type of transmission.

Other and further objects of the invention will be apparent from the following description and claims and may be understood by reference to the accompanying drawings, of which there are three sheets, which by way of illustration show a preferred embodiment of the invention and what I now consider to be the best mode in which I have contemplated applying the principles of my invention. Other embodiments of the invention may be used without departing from the scope of the present invention as set forth in the appended claims.

In the drawings:

Figure 4 is an enlarged fragmentary sectional view of one of the hydraulic pressure actuated multiple disc clutches.

Figure 1:
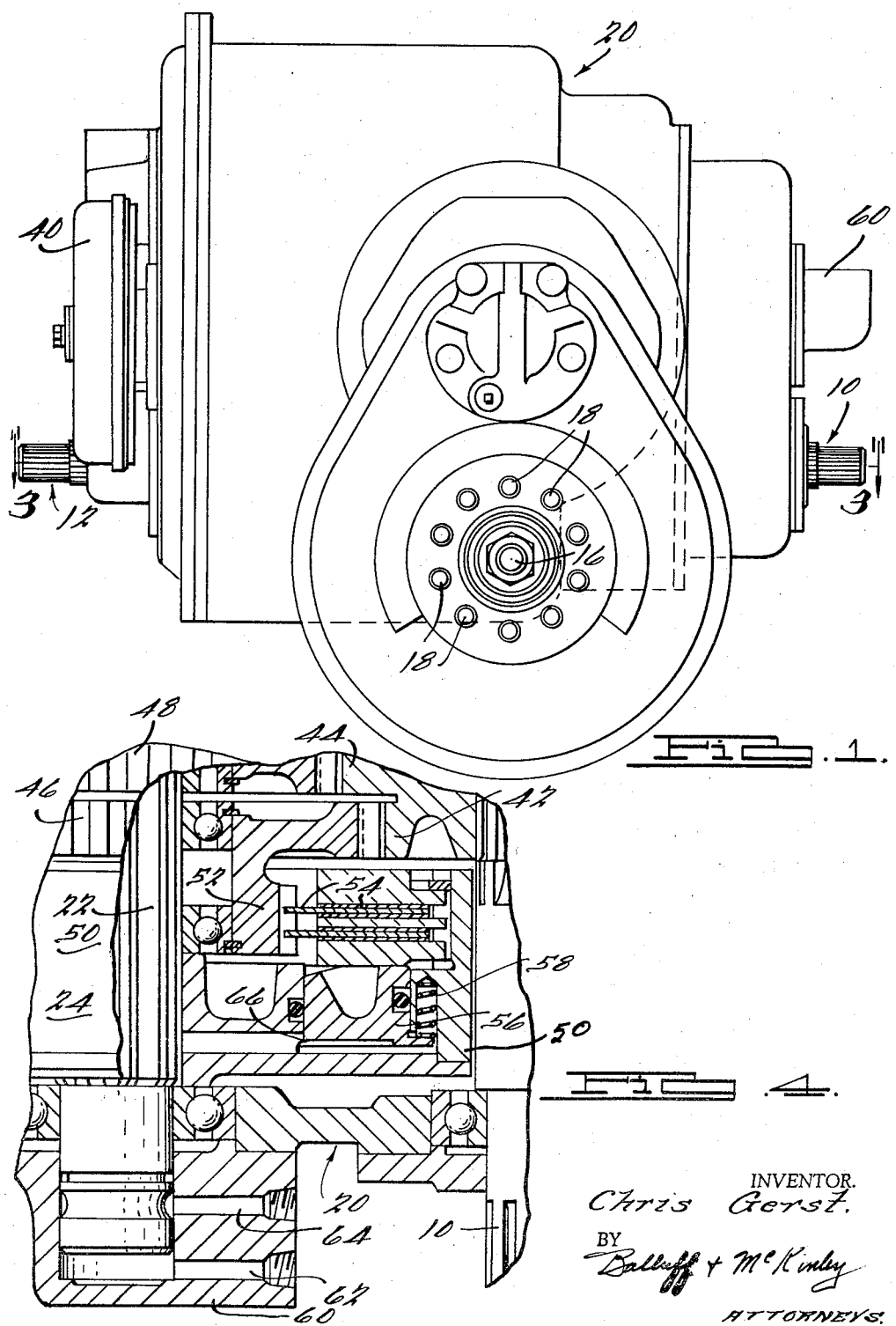
Figure 1 is a side elevational view of a transmission embodying the invention.
Figure 2:
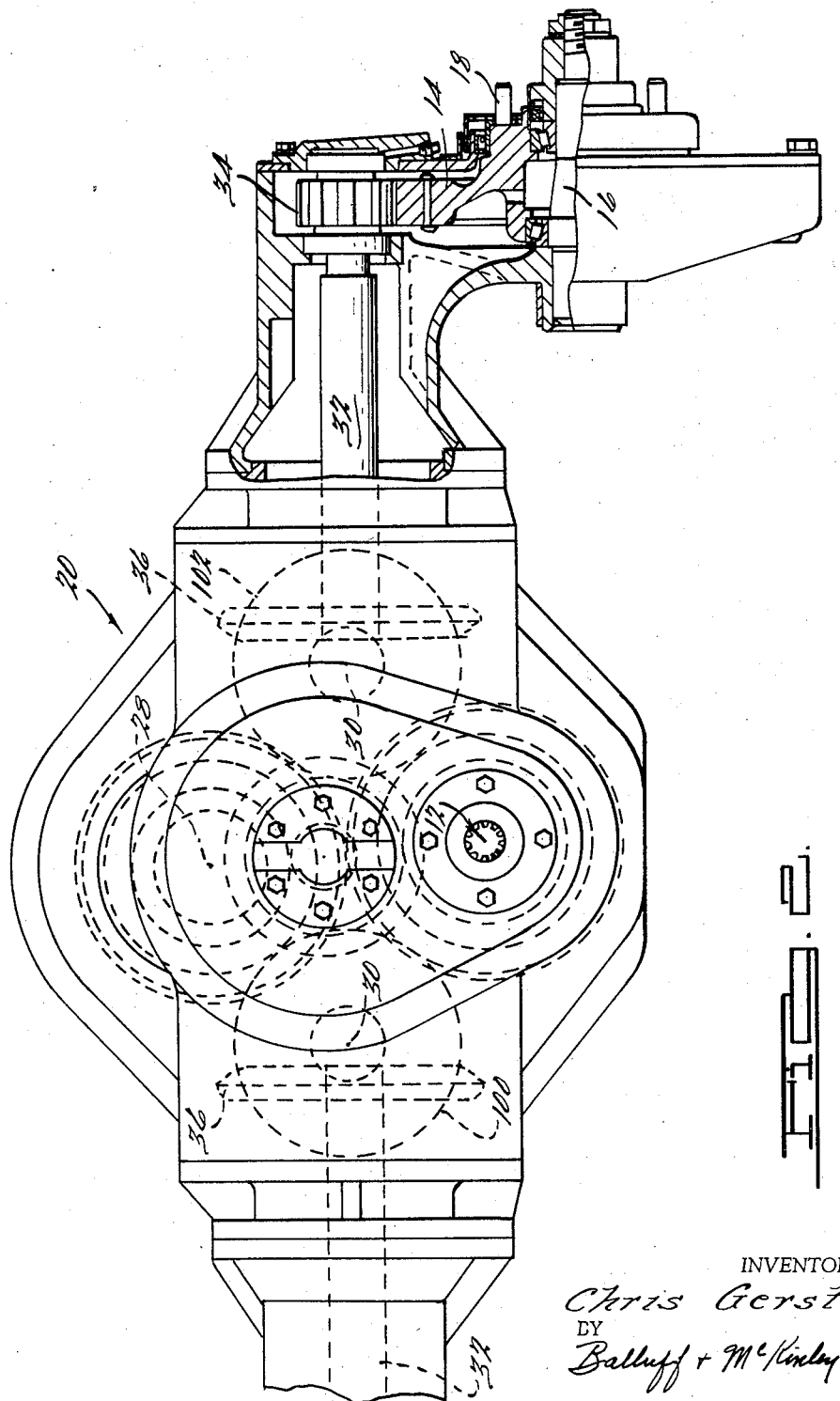
Figure 2 is a fragmentary rear elevational view with certain parts broken away.

As illustrated the transmission includes an input shaft 10, a power output shaft 12, and a pair of wheel or sprocket drive gears 14, one of which is shown in Fig. 2. Each of the gears 14 is journaled on a stub axle 16, the axles 16 being aligned and projecting from opposite sides of the transmission housing 20. Each gear 14 is provided with a series of threaded drive pins 18 adapted to be received in suitable openings in a drive sprocket or wheel which is secured to the gear 14 and driven thereby so as to provide the driving torque for the wheel or sprocket driven track, as the case may be, of the tractor.

The transmission includes a housing 20 made up of a plurality of castings which are suitably secured together to house and form a rigid frame for the working parts of the transmission and to contain lubricant for the bearings, shafts, gears and clutches of the transmission.

The transmission further includes a clutch shaft 22 which together with the input shaft 10, the clutches 24 and 26, and the associated gearing form a 4-speed gear drive arrangement on the input side of the transmission. In addition there is provided a pair of forward and reverse clutch shafts 28 and 12, the shaft 12 also functioning as a power take-off shaft. There are also provided a pair of bevel pinion or output shafts 30 and a pair of bevel gear or output shafts 32, the shafts 32 being axially aligned and symmetrically disposed at the opposite sides of the transmission. At its outer end each shaft 32 is provided with a pinion 34 in mesh with a gear 14, while at its inner end each shaft 32 is provided with a bevel gear 36, the teeth of which are in mesh with the teeth of the bevel pinion 38 carried by shaft 30.

Each shaft 30 projects rearwardly through a wall of the transmission and is provided with a manually controlled brake 40, the brake 40 normally being released but being operable under the control of the operator for holding the shaft 30 against rotation. The brakes 40 are independently controlled so that each shaft 30 can be held against rotation independently of the other. The construction of the brakes 40 is conventional and may be of the type now conventionally employed in transmissions of this type. It will be understood that suitable bearings are provided for all of the shafts of the transmission.

The input shaft 10 is suitably coupled to the engine of the vehicle so as to be driven thereby. The shafts 10, 12 and 22 are disposed in parallel, and the shaft 10 has gears 42 and 44 splined thereto for rotation therewith. Gear 46 rotatably journaled on shaft 22 is in constant mesh with gear 42, while gear 48 rotatably journaled on shaft 22 is in constant mesh with gear 44. The clutches 24 and 26 are normally disengaged. When engaged, the clutch 24 will couple the gear 46 to the shaft 22 so as to drive the latter, while clutch 26 when engaged will couple the gear 48 to the shaft 22 so as to drive the latter. The clutches 24 and 26 are manually controlled and operable so as to be alternately engageable so as to drive the shaft 22 from the shaft 10 either through gears 42 and 46 or through gears 44 and 48, depending upon whether clutch 24 or clutch 26 is engaged.

The clutches 24 and 26, as well as the clutches on the shafts 12 and 28 hereinafter referred to, are multiple disc hydraulic pressure actuated clutches of the construction shown in my prior application Serial No. 530,025, filed August 23, 1955, for "Hydraulically Actuated Multiple Disc Clutch," now Patent No. 2,880,834, issued April 7, 1959. A detail of the clutch 24 is shown in Fig. 4 and this is typical of the construction of the other clutches.

As shown in Fig. 4, the clutch 24 comprises a drum 50 which is splined to the shaft 22. A hub 52 of the gear 46 forms the driven part of the clutch. The hub 52 and the clutch drum 50 are provided with interleaved annular clutch discs 54 which when the clutch is disengaged run free with respect to each other. Upon the application of hydraulic pressure to the annular piston 56 of the clutch, the interleaved discs 54 will be clamped together so as to cause the clutch members 50 and 52 to turn together. A series of springs 58 biases the clutch piston to its disengaged position so that when the hydraulic pressure on the piston is released the pressure on the clutch discs will be immediately released so as to effect immediate disengagement of the clutch.

An end of the shaft 22 projects outwardly of the transmission housing 20 where a cap 60 is provided, the cap 60 being provided with passages 62 and 64 and the outer ends of the passages being threaded. Suitable couplings connected to the threaded ends of the passages 62 and 64 connect the same with a suitable source of fluid pressure under the control of the operator. The passages 62 and 64 at their inner ends communicate with ducts (not shown) in the shaft 22, which in turn communicate with the annular hydraulic cylinder 66 in which the piston 56 reciprocates for supplying hydraulic fluid under pressure thereto when it is desired to engage the clutch, and for relieving such pressure when it is desired to release the clutch.

The supply of hydralic fluid pressure to the clutch 24 is under the control of a valve operated by the operator of the vehicle. Thus when the clutch 24 is engaged, the gear 46 is coupled to the shaft 22 for driving the same, while when the clutch 26 is engaged the gear 48 is coupled to the shaft 22 for driving the same. As noted above, the clutches 24 and 26 are normally disengaged, and the valve controls for the hydraulic system which controls the clutches 24 and 26 are arranged so that only one of the clutches 24 and 26 can be engaged at the same time.

It will be observed in Fig. 4 that the gears 42 and 44 constitute in effect a double gear which is splined on a splined portion of the shaft 10 so as to rotate therewith. Thus, depending upon which of the clutches 24 and 26 are engaged, it will be evident that the shaft 22 may be driven at two different speed reductions with respect to the shaft 10.

The forwardly projecting end of 70 of the shaft 12 is splined and has a double gear 72, 74 slidably splined thereon. The shaft 22 has gears 76 and 78 splined thereon so as to rotate therewith. A suitable shifting means (not shown) is arranged for shifting the double gear 72, 74 from its neutral position, in which it is shown, in one direction so as to mesh the teeth of gear 72 with the teeth of gear 76, or in the other direction so as to mesh the teeth of gear 74 with the teeth of gear 78, thus providing a two-speed gear arrangement for driving the shaft 12 from the shaft 22. Thus the gears 42, 44, 46 and 48, the clutches 24 and 26, the gears 72, 74, 76 and 78, and the shaft 22 provide a 4-speed reduction gear drive between the shaft 10 and the shaft 12.

Figure 3:
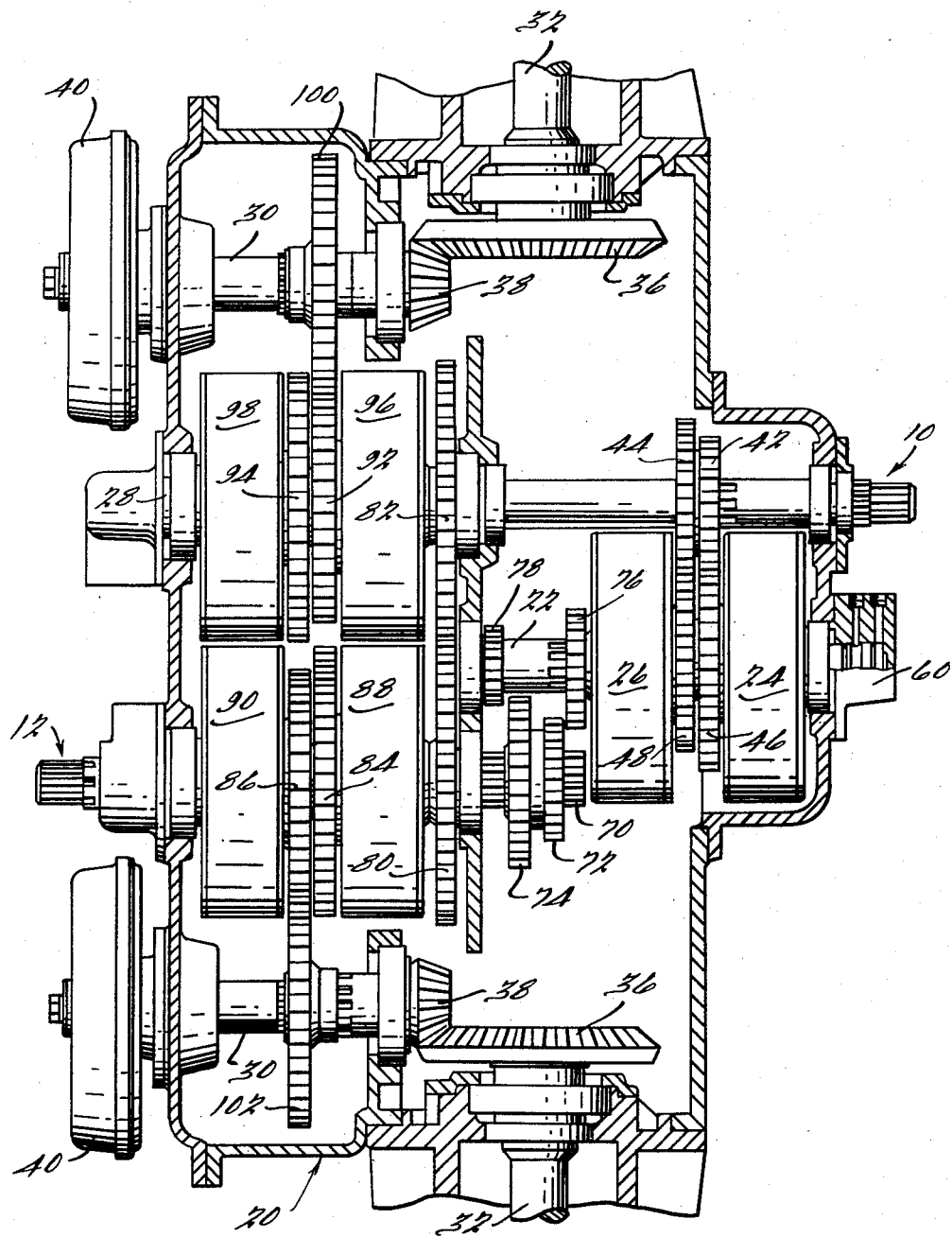
Figure 3 is a developed fragmentary horizontal sectional view taken generally along the line 3—3 of Figure 1.

The shafts 10 and 12 are axially aligned. However, in Fig. 3 the shafts 12 and 28 are shown in a developed view out of their normal position so as to show the power drive train of the transmission. Fig. 2 shows the actual axes of the shafts and their disposition relative to each other. Thus, in Fig. 2 the reference characters designating the respective shafts are applied to the axes thereof, while the brakes 40 have been omitted.

The shaft 12 has a gear 80 splined thereon for rotation therewith, while the shaft 28 has a gear 82 splined thereon for rotation therewith, the teeth of the gears 80 and 82 being in constant mesh so that the shafts 12 and 28 will be driven together but in opposite directions. The shaft 12 has a reverse drive gear 84 rotatably journaled thereon and a forward drive gear 86 rotatably journaled thereon, as well as a normally disengaged multiple disc clutch 88 and a normally disengaged multiple disc clutch 90 thereon. When engaged the clutch 88 will couple the reverse drive gear 84 to the shaft 12 so that the gear 84 will turn with the shaft, while the clutch 90 when engaged will couple the gear 86 to the shaft 12 so as to turn therewith. The clutches 88 and 90 are similar to the clutches 24 and 26 and controlled in a similar fashion. Normally they are disengaged, but they are adapted to be engaged so as to drive either the gear 84 or the gear 86, or both.

The shaft 28 has a forward gear 92 journaled thereon and a reverse gear 94 journaled thereon. A hydraulically actuated multiple disc clutch 96 is normally disengaged but is adapted when engaged to couple the gear 92 to the shaft 28 so that the gear 92 will rotate with the shaft 28 and the gear 82. A hydraulically actuated multiple disc clutch 98 on the shaft 28 is normally disengaged but is adapted when engaged to couple the gear 94 to the shaft 28 so as to turn therewith and with the gear 82. The controls for the clutches 96 and 98 are similar to those for the clutches 88 and 90 and are adapted to be engaged so that either the gear 92 or the gear 94 will be driven with the shaft 28, or both may be driven from the shaft 28. The controls for the clutches 96 and 98 are operable independently of the controls for the clutches 88 and 90, and also independently of the controls for the clutches 24 and 26.

The gears 84 and 92 are in constant mesh with a gear 100 splined on the shaft 30 so as to turn therewith, while the gears 94 and 86 are both in constant mesh with a gear 102 splined on the shaft 30 so as to turn therewith. Thus the gear 100 may be driven from the shaft 12 through the clutch 88 and gear 84, or from the shaft 28 through the clutch 96 and gear 92, depending upon which of the clutches 88 and 96 is engaged. The clutches 88 and 96 are alternately engageable. The clutch 88 provides for reverse drive of the gear 100 while the clutch 96 provides for forward drive of the gear 100. The gears 86 and 94 each mesh with the gear 102 for driving the same and, depending upon whether the clutch 90 or the clutch 98 is engaged, the gear 102 will be driven from the shaft 12 or the shaft 28. The clutch 90 provides for forward drive of the shaft 30, while the clutch 98 provides for reverse drive of the shaft 30. The clutches 90 and 98 are alternately engageable.

The clutches 88, 90, 96 and 98 are controlled so that the gear 100 may be driven independently of the gear 102, and the gear 102 may be driven so as to provide a drive in one direction while the gear 100 may at the same time be driven so as to provide a drive in the opposite direction; or the gears 100 and 102 may be driven simultaneously so as to provide a drive in the same direction; or either of the gears 100 and 102 may be driven while the other is not driven or is held against rotation by one of the brakes 40.

Each of the brakes 40 is driver controlled by a foot pedal or other suitable control (not shown) which may be interconnected with the valves (not shown) which control the forward and reverse clutches (on the shafts 12 and 28) so that when such pedal is actuated to apply the brake 40 on one side of the tractor, the engaged clutch through which driving torque is then being transmitted to such side of the tractor will be disengaged so as to expedite turning of the vehicle. It will be understood that all of the controls for the clutches, brakes, and shiftable gears of the transmission are grouped and arranged so that one operator may easily control the transmission and thereby drive and maneuver the tractor while moving forwardly or reversely or turning in either direction. The counterrotating characteristics of the transmission together with the fluid pressure actuated multiple disc clutches are important factors in the flexibility of performance and maneuverability provided by the transmission.

While I have illustrated and described a preferred embodiment of my invention, it is understood that this is capable of modification, and I therefore do not wish to be limited to the precise details set forth but desire to avail myself of such changes and alterations as fall within the purview of the following claims.

I claim:

1. A counterrotating transmission comprising an input shaft, a pair of output shafts, a pair of clutch shafts geared together so as to turn in opposite directions and connected to said input shaft so as to be driven thereby, a set of gears including one rotatably journaled on each of said clutch shafts, geared with one of said output shafts, another set of gears including one rotatably journaled on each of said clutch shafts, geared with the other of said output shafts, and a normally disengaged clutch operatively disposed between each of said clutch shafts and each of said gears thereon for selectively coupling said gears on each of the clutch shafts thereto, the geared interconnection between said clutch shafts being independent of the geared interconnections between said clutch and output shafts.

2. A transmission according to claim 1 including change speed gearing operatively disposed between said input shaft and said clutch shafts and wherein one of said clutch shafts forms a power take-off shaft, said clutch shafts and pair of output shafts being disposed parallel to each other.

3. A transmission according to claim 1 wherein said input shaft is disposed in parallel with one of said clutch shafts and in alignment with the other, and change speed gearing is operatively arranged between said one of said clutch shafts and said input shaft.

4. A transmission according to claim 1 including a pair of axially aligned laterally extending drive shafts, one connected in driving relation with each of said output shafts.

5. A counterrotating transmission comprising an input shaft, a pair of axially aligned output shafts, a pair of clutch shafts geared together so as to turn in opposite directions and connected to said input shaft so as to be driven thereby, a set of gears including one rotatably journaled on each of said clutch shafts, geared with one of said aligned shafts, another set of gears including one rotatably journaled on each of said clutch shafts, geared with the other of said aligned shafts, and a normally disengaged disc clutch operatively disposed between each of said clutch shafts and each of said gears thereon for selectively coupling said gears on each of the clutch shafts thereto, the geared interconnection between said clutch shafts being independent of the geared interconnections betwen said clutch and output shafts.

6. A counterrotating transmission comprising a pair of unidirectional clutch shafts geared together so as to turn in opposite directions, change speed gearing connected to one of said shafts for driving said shafts, a pair of output shafts, and other gearing including a normally disengaged clutch providing a drive between each of said output shafts and each of said clutch shafts.

7. A transmission according to claim 6 wherein each of said output shafts is provided with a brake on the outside of said transmission.

8. A counterrotating transmission comprising a pair of parallel unidirectional clutch shafts, a pair of parallel output shafts each having a gear thereon, each of said clutch shafts having a first gear rotatably journaled thereon geared to said gear on one of said output shafts, each of said clutch shafts having a second gear rotatably journaled thereon geared to said gear on the other of said output shafts, a clutch operatively disposed between each of said first gears and the clutch shaft on which it is journaled, a clutch operatively disposed between each of said second gears and the clutch shaft on which it is journaled, and other means including constant mesh gearing interconnecting said clutch shafts for simultaneously driving said shafts in opposite directions relative to each other.

9. A transmission according to claim 8 wherein said means comprise an input shaft and change speed gearing between said input shaft and one of said clutch shafts.

10. A counterrotating transmission comprising an input shaft, a pair of clutch shafts, one of which is aligned with said input shaft, said clutch shafts being geared together so as to rotate in opposite directions relative to each other, selective change speed gearing between said input shaft and one of said clutch shafts for selectively driving the same at different speeds relative to said input shaft, a pair of output shafts, a clutch controlled gear train between each of said clutch shafts and each of said output shafts, said clutch shafts being arranged in parallel with respect to each other, each of said clutch controlled gear trains including a normally disengaged multiple disc clutch, and being independent of the geared interconnection between said clutch shafts.

11. A transmission according to claim 10 wherein said output shafts are axially aligned and project laterally from the transmission at the sides thereof and wherein one of said clutch shafts projects from the transmission and forms a power take-off shaft.

12. A counterrotating transmission comprising an input shaft, a pair of parallel clutch shafts, one of which overlaps said input shaft, said clutch shafts being geared together so as to rotate in opposite directions relative to each other, selective change speed gearing including a normally disengaged disc clutch between said input shaft and said one of said clutch shafts for unidirectionally driving said clutch shafts at different speeds relative to said input shaft, a pair of output shafts disposed in parallel relation with said clutch shafts, a clutch controlled gear train providing a drive between each of said clutch shafts and each of said output shafts independently of the geared interconnection between said clutch shafts, each of said clutch controlled gear trains including a normally disengaged multiple disc clutch, and a pair of aligned laterally projecting drive shafts, one of which is geared to each of said output shafts.

13. A counterrotating transmission comprising a pair of clutch shafts each having a forward and a reverse drive gear rotatably journaled thereon, a normally disengaged fluid pressure actuated clutch between each of said gears and the shaft on which it is journaled for selectively coupling said gear in driving relation with the shaft on which it is mounted, a pair of output shafts arranged in parallel with each other and with said clutch shafts, a gear nonrotatably fixed on each of said output shafts and in mesh with one of said gears on each of said clutch shafts, and means for simultaneously driving said clutch shafts in opposite directions, including constant mesh gearing interconnecting said clutch shafts independently of the aforesaid gears.

14. A transmission according to claim 13 wherein said means comprise an input shaft disposed parallel to one of said clutch shafts and selectively controlled multispeed gearing between said input shaft and one of said clutch shafts.

15. A transmission according to claim 1 wherein each of said output shafts is provided with a brake.

16. A transmission according to claim 1 wherein each of said clutches is a normally disengaged, hydraulically actuated multiple disc clutch.

17. A transmission according to claim 6 wherein each said clutch shafts are disposed parallel to each other.

18. A transmission according to claim 6 wherein each of said clutch shafts has a pair of said clutches mounted thereon, each of said clutches comprising a hydraulically actuated multiple disc clutch.

19. A transmission according to claim 8 wherein each of said clutches comprises a normally disengaged fluid pressure actuated multiple disc clutch.

20. A counterrotating transmission comprising an input shaft, a pair of clutch shafts disposed in parallel and continuously geared together and drivingly connected to said input shaft so as to be simultaneously driven thereby, a set of gears one journaled on each of said clutch shafts, an output shaft geared with each of said gears independently of the gearing interconnecting said clutch shafts, another set of gears one journaled on each of said clutch shafts, another output shaft geared with each of the second set of gears independently of the gearing interconnecting said clutch shafts, and a normally disengaged, hydraulically actuated multiple disc clutch operatively disposed between each of said clutch shafts and each of said gears thereon for selectively coupling said gears on each of said clutch shafts thereto, said output shafts being axially aligned and disposed on opposite sides of said transmission.

21. A counterrotating transmission comprising a pair of unidirectional clutch shafts continuously geared together so as to turn simultaneously, means for driving said shafts, a pair of axially aligned output shafts, and other gearing including a normally disengaged multiple disc clutch adapted to provide a drive between each of said output shafts and each of said clutch shafts, said output shafts being disposed on opposite sides of said transmission and said clutches being mounted on said clutch shafts.

22. A counterrotating transmission comprising a pair of parallel clutch shafts continuously geared together, a pair of output shafts each having a gear thereon and disposed parallel to said clutch shafts, each of said clutch shafts having a first gear rotatably journaled thereon geared to said gear on one of said output shafts independently of the geared interconnection between said clutch shafts, each of said clutch shafts having a second gear rotatably journaled thereon geared to said gear on the other one of said output shafts independently of the geared interconnection between said clutch shafts, a normally disengaged hydraulically actuated multiple disc clutch operatively disposed between each of said first gears and the clutch shaft on which it is journaled, a normally disengaged hydraulically actuated multiple disc clutch operatively disposed between each of said second gears and the clutch shaft on which it is journaled, means for driving said clutch shafts simultaneously in opposite directions relative to each other, and a pair of axially aligned shafts one coupled with each of said output shafts.

References Cited in the file of this patent

UNITED STATES PATENTS 2,205,300     Marsh _____ June 18, 1940